United States Patent
Garrison

(10) Patent No.: US 11,301,193 B2
(45) Date of Patent: *Apr. 12, 2022

(54) METHODS AND SYSTEM FOR WIRELESS THERMAL PRINTING FOR ORDER FULFILLMENT

(71) Applicant: Chit Yes, LLC, Chapel Hill, NC (US)

(72) Inventor: Wesley S. Garrison, Chapel Hill, NC (US)

(73) Assignee: CHIT YES, LLC, Chapel Hill, NC (US)

( * ) Notice: Subject to any disclaimer, the term of this patent is extended or adjusted under 35 U.S.C. 154(b) by 149 days.

This patent is subject to a terminal disclaimer.

(21) Appl. No.: 16/551,147

(22) Filed: Aug. 26, 2019

(65) Prior Publication Data

US 2019/0377532 A1    Dec. 12, 2019

Related U.S. Application Data

(63) Continuation-in-part of application No. 15/200,344, filed on Jul. 1, 2016, now Pat. No. 10,402,891, which
(Continued)

(51) Int. Cl.
*G06Q 30/00* (2012.01)
*G06F 3/12* (2006.01)
(Continued)

(52) U.S. Cl.
CPC .......... *G06F 3/1292* (2013.01); *G06F 3/1207* (2013.01); *G06F 3/1238* (2013.01); *G06K 15/002* (2013.01); *G06Q 30/0635* (2013.01)

(58) Field of Classification Search
CPC .............. G06Q 30/0635; G06K 15/002; G06F 3/1238; G06F 12/1207; G06F 3/1292; G06F 3/1207
(Continued)

(56) References Cited

U.S. PATENT DOCUMENTS 6,297,893 B1    10/2001    Moretta et al.
7,680,690 B1 *  3/2010    Catalano ................ G06Q 30/02
                                                    705/15
(Continued)

FOREIGN PATENT DOCUMENTS

GB        2472018 A       1/2011
WO    2006133713 A2      12/2006
(Continued)

OTHER PUBLICATIONS

Business Wire, "Feldman's Deli Grows Sales with Cirra Systems Tavlo and Epson MoniLink," Jul. 29, 2014 <https://www.businesswire.com/news/home/20140729005113/en/Feldman%E2%80%99s-Deli-Grows-Sales-with-Cirra-Systems-Tavlo-and-Epson-OmniLink> (Year: 2014).*

(Continued)

*Primary Examiner* — Allison G Wood

(74) *Attorney, Agent, or Firm* — Neo Ip

(57) ABSTRACT

Systems, methods, and a printer apparatus using network-based communication over wireless networks, and provides for electronic response from the printer relating to order confirmation and fulfillment at the recipient printer, in communication to an order management coordinator or server. The printer provides an order output including at least one symbol representing an order, including order information. The printer is operable to broadcast a wireless communication signal for proximity marketing and order delivery coordination.

20 Claims, 9 Drawing Sheets

Related U.S. Application Data is a continuation-in-part of application No. 13/958,572, filed on Aug. 4, 2013, now Pat. No. 9,384,508.

(51) Int. Cl.
*G06K 15/00* (2006.01)
*G06Q 30/06* (2012.01)

(58) Field of Classification Search
USPC .............................................. 705/26.1–27.2
See application file for complete search history.

(56) References Cited

U.S. PATENT DOCUMENTS

| | | | | |
|---|---|---|---|---|
| 7,680,705 | B2* | 3/2010 | Healy | G06Q 30/0633 705/26.8 |
| 8,200,550 | B2 | 6/2012 | Aitkins | |
| 8,282,002 | B2* | 10/2012 | Shams | G06K 7/10 235/462.07 |
| 9,031,867 | B1 | 5/2015 | Crawford | |
| 2004/0035643 | A1 | 2/2004 | Dev et al. | |
| 2004/0158499 | A1 | 8/2004 | Dev et al. | |
| 2004/0225560 | A1* | 11/2004 | Lewis | G06Q 30/0235 705/14.35 |
| 2005/0060250 | A1 | 3/2005 | Heller et al. | |
| 2005/0160077 | A1* | 7/2005 | Howes | G06Q 30/0621 |
| 2005/0182680 | A1* | 8/2005 | Jones | G06Q 30/00 705/15 |
| 2005/0246245 | A1 | 11/2005 | Satchell et al. | |
| 2006/0085240 | A1* | 4/2006 | Salehi-sedeh | G06Q 10/0875 705/29 |
| 2008/0250122 | A1* | 10/2008 | Zsigmond | H04L 67/04 709/220 |
| 2008/0262972 | A1* | 10/2008 | Blake | G06Q 20/401 705/75 |
| 2009/0287550 | A1 | 11/2009 | Jennings | |
| 2011/0121069 | A1* | 5/2011 | Lindahl | G06K 19/06 235/375 |
| 2011/0184822 | A1 | 7/2011 | Matkovic | |
| 2012/0215584 | A1* | 8/2012 | Narsude | H04L 43/06 705/7.29 |
| 2013/0030955 | A1 | 1/2013 | David | |
| 2013/0211939 | A1 | 8/2013 | Katira et al. | |
| 2013/0238458 | A1* | 9/2013 | Iso | G06F 16/9535 705/23 |
| 2016/0063473 | A1* | 3/2016 | Lee | G06Q 30/0633 705/15 |
| 2016/0155292 | A1* | 6/2016 | Mound | H04W 4/21 463/19 |
| 2016/0314516 | A1* | 10/2016 | Garrison | G06Q 20/321 |
| 2018/0160269 | A1* | 6/2018 | Baarman | H04W 4/80 |
| 2019/0339672 | A1* | 11/2019 | Bancroft | B60P 3/00 |
| 2019/0371113 | A1* | 12/2019 | Bennett, III | G07F 17/323 |
| 2019/0385130 | A1* | 12/2019 | Mossoba | G06Q 20/02 |

FOREIGN PATENT DOCUMENTS

| | | | |
|---|---|---|---|
| WO | 2008004241 A2 | 1/2008 | |
| WO | 2008046613 A1 | 4/2008 | |
| WO | 2010037394 A1 | 4/2010 | |
| WO | WO-2010037394 A1 * | 4/2010 | .......... G07G 1/0045 |
| WO | 2011149533 A1 | 12/2011 | |

OTHER PUBLICATIONS

Bahn, Chris, Robbie Neiswanger. Retailer Stretches Grocery Pickup. Published via Arkansas Democrat Gazette. Published on Jun. 5, 2015. Accessed via https://www.arkansasonline.com/news/2015/jun/05/retailer-stretches-grocery-pickup-20150/ (Year: 2015).*

Restaurants get creative with QR codes. Retrieved from http://www.restaurantbusinessonline.com/operations/technology/restaurants-get-creative-qr-codes (Year: 2012).

* cited by examiner

Tarheel
Takeout.com
(919) 942-7678

8/ 2 at 11:09am
Order No:
25

| Qty | Item name | Each |
|---|---|---|
| | ACP - Arroz Con Pollo (small) | $ 8.95 |
| | - Lettuce, tomato, and sour cream | $ 0.00 |
| | ACP - Arroz Con Pollo (small) | $ 8.95 |
| | - Refried Beans | $ 0.00 |
| | Acupolco Taco Salad | $ 9.95 |
| | - Chicken | $ 0.00 |

Items: $27.85
Tax: $ 2.09
Total: $29.94

METHODS AND SYSTEM FOR WIRELESS THERMAL PRINTING FOR ORDER FULFILLMENT

CROSS-REFERENCES TO RELATED APPLICATIONS

This application is a continuation-in-part of U.S. application Ser. No. 15/200,344, filed Jul. 1, 2016, which is a continuation-in-part of U.S. application Ser. No. 13/958,572, now U.S. Pat. No. 9,384,508, filed Aug. 4, 2013, each of which is incorporated herein by reference in its entirety.

BACKGROUND OF THE INVENTION

Field of the Invention

The present invention relates to distributed order fulfillment systems and methods, including a wireless printer device for network-based communications relating to orders for goods and/or services and the management and fulfillment of those orders.

2. Description of the Prior Art

Generally, it is known in the relevant art to provide remote ordering systems and methods to allow customers to place an order for items, such as restaurant food, by sending a text message or SMS message from a mobile phone or by placing an order through a website, located remotely from the provider of the items. It is also known in the art to use thermal printing for order processing and fulfillment for restaurants. By way of background, thermal printing provides digital printing without ink; the methods include selectively heating coated thermochromic paper or thermal paper to produce a printed image without ink when the paper passes over a thermal print head, which transforms the selectively heated spots black, thereby producing a printed image or text on the paper.

More specifically, it is known in the prior art to use wireless thermal printers for receiving text messages or short message service (SMS) messages for printing orders based upon the message. However, the recipient printer apparatus does not provide for communication over 3G or 4G wireless networks, and does not allow for response relating to order confirmation and fulfillment at the recipient printer, in communication to an order management coordinator or server or to individual remote order placing individuals or entities.

Relevant prior art references are exemplified in the following documents:

UK Patent Application No. GB2472018, filed Jul. 21, 2009 (also related to GB Patent Application No. GB0912623.6) by Sujan, for "Ordering System," discloses an ordering system consisting of webpage(s) placing orders and two other devices process the order in a remote location such as a takeaway or a restaurant, wherein the invention sends the order by only sending encoded SMS messages to a printer device which is the first device receiving the order via the GSM network and then decodes the order with the embedded hardware and prints the order with all kinds of formation required. This order is then accepted or rejected by the device user and the status is sent back to the SMS sender via encoded SMS. The second device is a satellite navigator with barcode reader to read the order address from the printed barcode and set the destination of the navigation system automatically. The thermal printer device is sold commercially in the UK by iBacs Ltd./iBacsTel Remote Printers, and described on its company website as operable to receive and print orders in a remote location via the GSM network (SMS) so that when messages are directly received to this GSM printer it has the functionality to process the order and can reply back status messages, namely accept, reject, delete, and feed (and numerical keys are provided as the only other functional buttons on the device) to the designated server via SMS. The company website states that this printer has the following limitations: "at the simplest level it is possible to send one way message to the printer; at the most complicated it is possible to set expire times for message, require restaurants acknowledge receipt of message before they are printed, receive feedback from the restaurant relating to the message, e.g. a delivery time for an order, and remove message from the printer queue that have not yet been printed." Notably, this printer is used for direct communication via SMS with customers placing food orders (to-go, pickup or delivery). Also, this printer is limited in printout dimensions at 58 mm width.

U.S. Pat. No. 8,200,550, filed May 15, 2007 by Stephen Aitkins, for "Systems and methods for remote ordering," teaches systems and methods for remote ordering where there is a client that is configurable to accept orders; an information processing system, that is in communication with the client and configurable to receive orders from the client; a plurality of wireless modules in disparate physical locations that are in wireless communication with the information processing system and configurable to receive orders from the information processing system; and an order presentation client that is in communication with the wireless module and configurable to present the order. Furthermore, the information processing system is configurable to route the orders to a selected wireless module based on the order.

U.S. Patent Application Publication No. 20050060250, filed Sep. 17, 2003 by Haparnas et al., for "Billing and ordering system and method for services provided over communications networks," discloses a method for ordering a service over a communications network having the steps of selecting a first service to be provided from a first system to a second system, wherein the service is associated with a first code; a message comprising the first code and user identifying information is generated in response to selecting the first service. The message is forwarded to the first system from the second system.

WIPO Publication No. WO2006133713, filed Jun. 16, 2006 by Jesper et al., for "Ordering system with terminal unit using a wireless network," describes an ordering system for ordering services or goods comprising a plurality of client computers connected to a digital data network, the client computers comprising means for receiving input from a client concerning orders, a central server system comprising a first software program and being connected to a first database and to the digital data network, the first database comprising digital data representing information about services or goods, service providers or good providers, the first software program being configured for communication with the client computers through the digital data network for providing data from the first database to the client computers concerning offers for services or goods and for receiving digital data representing the orders for the services or goods, the first software program being programmed to transmit an order to a service provider or goods provider in dependence of the order from a client, at least one terminal unit at the site for the service provider or good provider, the terminal unit being configured for receiving orders from the first software program and having means for indicating the requested orders to the service or goods provider, a wireless digital data network for transmitting data between the first software program and the terminal unit through a non-dedicated wireless line.

WIPO Publication No. WO2008004241, filed Jul. 8, 2007 by Alon Scharz, for "A method and system for ordering and supplying goods and services via a cellular phone," describes a method and a system for ordering and supplying goods and services including the steps of an end user sending a coded SMS message using a specially created syntax from a cellular device to an intermediary computer, which is configured to identify the supplier of goods being ordered from the coded SMS message and route the received message to the identified supplier of goods. The coded SMS message may also include unique identifiers for identifying goods being ordered, menu or catalog identifier codes, identifiers to identify the method of payment and the method of delivery.

WIPO Publication No. WO2008046613, filed Oct. 18, 2007 by Wolfram Reiners, for "A method to take orders and to handle billing for third party services for mobile devices," describes a method for taking orders and handling billing for third party services is disclosed that comprises the steps of: under the control of an initiating digital device: creating and sending an order to a computerized operator system (A), the order being a formatted text message containing order information data; under the control of the computerized operator system (A): receiving the order, validating the formatted text message contained in the received order, creating a formatted text message confirming the order and sending the formatted text message to the initiating digital device or, in the case of invalid received data, returning an error message, under the control of a digital device of a merchant (B): receiving the formatted text message confirming the order; creating a formatted text message reconfirming the order and confirming that payment has been received, and sending the same back to the computerized operator system (A), wherein the computerized operator system (A) charges the merchant bank account on receipt of the formatted text message reconfirming the order.

However, the prior art references nowhere teach or provide the improved systems, methods, and apparatus of the present invention, as set forth in the detailed description of this specification.

SUMMARY OF THE INVENTION

The present invention relates to remote ordering of products and/or services wherein the order is placed by a mobile communications device, such as a mobile phone or smartphone or computer, in network-based communication with a recipient server computer, which in turn is in network-based communication with a wireless printer device capable of interactive communication to receive and send messages, and to print and to scan and/or receive digital symbolic representations of an order for products and/or services. The present invention systems, methods, and apparatus provide for remote order processing to fulfillment with automated transformation of the order to a digital representation of the order including at least one unique symbol used for transmitting and for communicating order fulfillment upon completion by a third party.

It is an object of this invention to provide systems and apparatus embodiments of the present invention that are operable and function to perform method steps for order processing, management, and fulfillment including the steps of: receiving at an order recipient server computer, at least one message including an order that was initiated and sent from a corresponding at least one remote mobile communications devices over a communications network; the order recipient server computer transforming the order into a digital representation of the order including at least one unique symbol and transmitting the order over the network to at least one order fulfillment printer device located at an order fulfillment entity; the order fulfillment printer device receiving the order and automatically and/or autonomously transforming the order to a printed order, including the digital representation of the order having the at least one unique symbol; and the order fulfillment printer device automatically producing a printout of the order. Also, the method steps may further include the step of the order fulfillment printer device automatically generating an audible and/or visual alert when the order is received. Additionally, after completion of the order fulfillment, the at least one unique symbol is scanned by the order fulfillment printer device and an order fulfillment message is automatically generated and sent to the order recipient server via the network.

These and other aspects and objects of the present invention will become apparent to those skilled in the art after a reading of the following description of the preferred embodiment when considered with the drawings, as they support the claimed invention.

DETAILED DESCRIPTION

Figure 1:
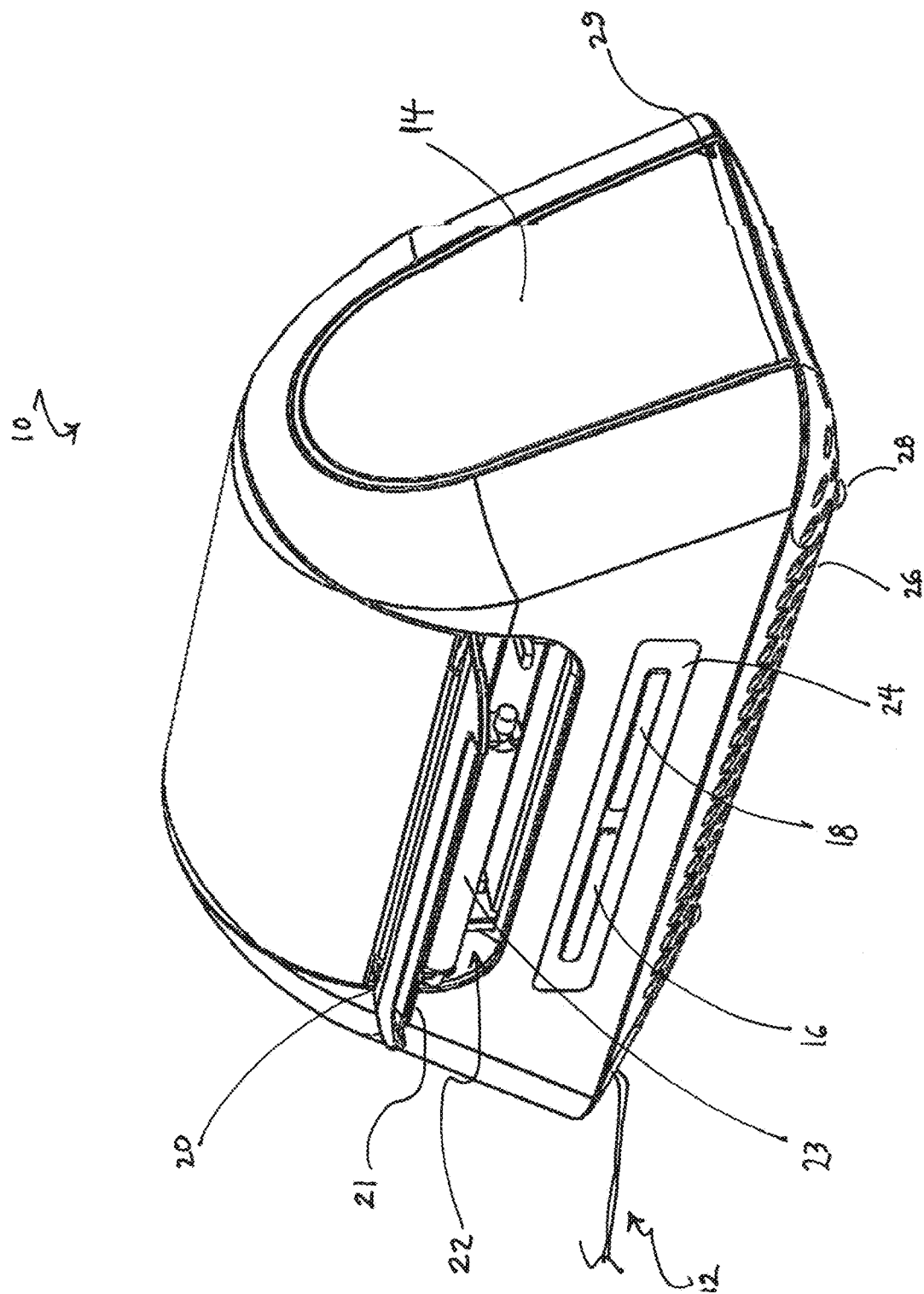
FIG. 1 is a schematic diagram showing a front perspective view of one embodiment of the apparatus of the invention.

The present invention systems, methods, and apparatus provide for remote order processing to fulfillment with automated transformation of the order to a digital representation of the order including at least one unique symbol used for transmitting and for communicating order fulfillment upon completion by a third party.

The present invention provides systems, methods, and a printer apparatus using network-based communication over 3G or 4G wireless networks, and provides for electronic response from the printer relating to order confirmation and fulfillment at the recipient printer, in communication to an order management coordinator or server or to individual remote order placing individuals or entities. The printer provides an order output including at least one symbol representing an order, including at least one of order content, ordering entity or individual, price, time of order, and combinations thereof.

This application is also related to U.S. application Ser. No. 14/608,903, filed Jan. 9, 2015, which is incorporated herein by reference in its entirety.

In one embodiment, the at least one unique symbol which represents the order and preferably includes all relevant information for the order is created in an application on the customer device. Preferably, the unique symbol represents the entire order information for the order and thus includes all relevant information associated with the order, including but not limited to the order, the order content, special dietary requests or restrictions for the order, substitutions for the order, spiciness levels for the order, order ID, customer ID, contact information for the customer, price, time of order, time of delivery requested, time of order fulfillment requested, payment status of the order, payment information for the order such as cash, a credit card number, a debit card number, a gift card number, etc., the number of the order for a particular customer, rewards points for the customer, instructions to redeem rewards points for the customer, and/or the number of the order per a predetermined time period such as per day, per breakfast session, per lunch session per dinner session, etc. Preferably, a payment processing device is operable to process the payment information for the order upon receiving the payment information via the order fulfillment printer device, the customer communication device, or the server computer. The payment processing device is preferably further operable to send a payment confirmation message to the order fulfillment printer device, the customer communication device, and/or the server computer Furthermore, upon receipt of the order at the wireless order fulfillment printer device, at least one alarm notification is automatically activated at the order fulfillment device, including audio and/or visual alert to indicate that an order was received. Preferably, the order fulfillment printer device automatically and autonomously transforms the order into a digital representation of the order, i.e., at least one symbol is generated that is unique to each order and is automatically printed as a tangible manifestation of the order. In a preferred embodiment, the order is printed on thermal paper without ink. A user will selectively activate a confirmation button on the order fulfillment printer device, which automatically sends a confirmation of receipt message to the receiving server via the network. In another embodiment, the order fulfillment printer device automatically sends a confirmation of receipt message to the server and/or to the customer communications device upon receiving the order and/or printing the order. Then, the printed order is used by order fulfillment at that same location where the order fulfillment printer device is located for providing the products and/or services that are required by the order. When the order is completely fulfilled, the unique symbol, preferably a QR code, is scanned by the order fulfillment printer, which automatically and autonomously generates a notification message that is communicated via the network to the receiving server computer. Also, a "call" button for selective activation is provided for sending a notice to the receiving server that a question or issue about the order exists with order fulfillment.

In a preferred embodiment of the present invention, a unique configuration symbol is used to configure the wireless order fulfillment printer device. The unique configuration symbol includes commands or instructions for the wireless order fulfillment printer device to configure itself. Commands relate to network configuration, WiFi parameter configuration, cellular network parameter configuration, printer settings, runtime settings, alarm settings, communication settings, etc. Preferably, the unique configuration symbol is a QR code. In another embodiment, the unique configuration symbol is a bar code. A computer, phone, or other electronic device is utilized to generate the unique configuration symbol. Preferably, the wireless order fulfillment printer device is operable to scan or read the unique configuration symbol and configure itself based on the commands or instructions in the QR code.

In another embodiment of the present invention, at least one mobile device of one or more employees of the order fulfillment entity are linked to the order fulfillment printer device and/or the at least one server computer. The at least one mobile device of one or more employees receives a digital representation of the order including at least one unique symbol from the at least one server computer in one embodiment. In another embodiment, the at least one mobile device of one or more employees receives a digital representation of the order including at least one unique symbol directly from the customer device. Preferably, the order fulfillment printer device and the employee mobile device receive the digital representation of the order at the same time. The mobile device is preferably operable to send the at least one unique symbol to any smart devices utilized in the order fulfillment facility or alternatively, is readable by any smart devices utilized in the order fulfillment facility. Preferably, the smart devices are devices included in the "internet of things" and the devices include by way of example and not limitation, robotics which fill customer orders at warehouses or smart appliances such as smart ovens, smart fridges, smart microwaves, or smart frying pans in restaurants. The smart devices or smart appliances are preferably operable, upon receiving the at least one unique symbol, to automatically take steps towards order fulfillment such as heating/cooling to a certain temperature.

The at least one mobile device of the one or more employees is preferably a smart phone or a wearable such as a smart watch or smart glasses. Preferably, the at least one mobile device includes a phone home button which provides notifying the sending server (and thus the sender) that there is a problem with the order, and they need to contact the fulfillment location. In another embodiment, the at least one mobile device includes a phone home button which is operable to initiate a phone call over a cellular or a WiFi network directly to the sender at a predetermined phone number from the fulfillment location, with staff at the fulfillment location able to speak into the mobile device and communicate with the sender. In another embodiment, the phone call is initiated via a voice command. In another embodiment, the phone home button sends a text or an email to the predetermined phone number.

The order fulfillment printer device is also preferably operable to print an adhesive digital representation of the order including the at least one unique symbol for attachment to one or more takeout boxes which will contain the order. In one embodiment, upon or proximate to delivery of the order, a communications device of the delivery driver or delivery device is operable to scan the at least one unique symbol to send the delivery time and/or delivery location to the server computer. In another embodiment, the unique symbol is readable by a delivery device, such as a drone or self-driving car. The unique symbol preferably includes GPS coordinates or an address for delivery of the order. Upon insertion of the one or more takeout boxes into the appropriate area of the delivery device, the delivery device is operable to read the unique symbol, travel to the specified GPS coordinates, and deliver the one or more takeout boxes. In one embodiment, the delivery device is operable to keep the one or more takeout boxes heated or cooled until the customer accepts the one or more takeout boxes. Preferably, the delivery vehicle is then operable to return to the order fulfillment entity location.

In another embodiment, to reorder the same order at a later date, the customer scans the at least one unique symbol through a mobile application or takes a picture of the at least one unique symbol through an application, wherein the application modifies the at least one unique symbol to include updated information such as the date, time, pickup, or payment information and sends the modified at least one unique symbol to the server computer, the order fulfillment printer, and/or one or more mobile devices of the employees at the order fulfillment location. In another embodiment, the at least one unique symbol which is linked to an employee's mobile device or to the takeout boxes is also linked to the GPS system of the employee's mobile device or to the GPS system of a vehicle for delivery orders. Using the unique symbol as identification of the order, the GPS system preferably provides customers real-time tracking information and real-time updates about the delivery order, including real-time location and estimated delivery time.

In systems and methods of the present invention, a wireless thermal printer apparatus is used within a distributed communications network that further includes a multiplicity of remote communications devices or computers in network-based connection and/or communication with at least one server computer for sending and receiving electronic messages; the printer also is constructed and configured for sending and receiving electronic messages over the communications network, which preferably supports 3G and 4G wireless communications. The electronic (digital) wireless messages are initiated and sent from a plurality of remote mobile communications devices (for example as SMS or text messages) to a server computer, which transmits them to at least one thermal printer device located at an order fulfillment entity, the printer device being operable to receive messages via wireless network-based communication.

The thermal printer device receives the message and automatically and/or autonomously transforms the message to a printed order, including a digital representation of the order having a symbol (e.g., bar code, QR code, etc.). The printer order may further include an order identification (ID), such as an ID number. Also, the digital representation of the order, including the symbol, corresponds to at least one of the following: a content of items in the order, a time of the order, a customer identifier, a customer location (address, GPS coordinates, etc.), items on the order, price of the order, method of payment or electronic payment confirmation, etc., and a fulfillment time of the order (when the order is requested to be fulfilled and/or received and/or delivered to the customer, if appropriate).

Preferred embodiments of the present invention include a quick response (QR) code in the printed output of the order, as illustrated in the figures. It is known in the art to provide a QR code or matrix bar code, or 2D bar code, as an optically machine-readable label or symbol that is associated with a product or service or business, and information related to the product, service or business. The information encoded by a QR code comprises four standardized types or modes of data, which are numeric, alphanumeric, binary, Kanji, or through supported extensions or links, virtually any type of data. QR codes have fast readability and greater storage capacity than bar codes. Prior art applications for QR codes include product tracking, item identification, time tracking, document management, general marketing, automated linking or scan-to-website through mobile smartphone or device applications is also a known application of QR codes.

The present invention includes an order printout, as set forth hereinabove, wherein the order printout includes at least one symbol, and, more particularly, a unique symbol is provided for each order; the at least one unique symbol for each order being selected from the group consisting of a bar code, a QR code, any digital symbol capable of representing an order or a request, including an order identifier, and combinations thereof. Preferably, the printout also provides for a payment status of the order. In another embodiment, the printout contains a second unique symbol, wherein the second unique symbol provides payment for the order upon being scanned. Preferably, the symbol provides a digital representation of the order and/or an electronic link to a website or to a computer, server, processor coupled with memory, or other computer device, including but not limited to a smartphone, wherein detailed information regarding the order, the order content, order ID, customer ID, price, time of order, time of delivery requested, time of order fulfillment requested, payment status of the order, payment information for the order, the number of the order for a particular customer, rewards points for the customer, instructions to redeem rewards points for the customer, and combinations thereof are provided or indicated. The symbol is optically scannable or readable by the printer device and/or a symbol reader or device coupled with, integrated with, and/or connected to the printer device, and equipped with software and hardware for receiving an image of the symbol and associating the symbol with the order and generating a signal or a message regarding the order fulfillment corresponding to that symbol. Preferably, the symbol is unique to each order and operable for identifying the order, the customer, the timing of the order placement, the timing of order completion or fulfillment, the price, order tracking in processing or status of the order, and combinations thereof. In one embodiment, the digital representation of the order and/or the printout includes a payment status for an order.

The printer device provides a scan of the digital representation or symbol (QR code) upon fulfillment of the order, and transforms the scanned symbol into a message for confirmation of order fulfillment, and the message is transmitted over the network to the server computer of the order receiving entity. The order receiving entity server receives the message confirming order fulfillment and takes action relating to delivery, shipment, and/or notification of the end customer.

Hardware or firmware and/or software are operable on the printer device for receiving wireless messages and transforming them into the order printout including at least the digital representation of the order, including at least one symbol, preferably a QR code that is unique to each order; a chipset and board including a processor coupled with memory is provided, and the printer device is constructed and configured for optical scanning of the at least one symbol for automatically and/or autonomously generating an order fulfillment message and transmitting it or sending it via wireless network-based communication to the receiving entity server, which is remotely located from the printer device.

The present invention provides systems and methods for remote ordering where there is at least one customer who places an order on a corresponding at least one remote communication device for communicating an electronic message to a server computer that is part of an order processing and fulfillment system, which then transmits the message to a receiving entity device that is configurable to accept orders; preferably, the at least one remote communication device is a mobile, wireless communication device. The order processing and fulfillment system is constructed and configured for network-based communication with the customer remote communication device(s) and configurable to receive orders from them; a multiplicity of order fulfillment devices that are also in network-based communication with the server computer, and positioned in distributed locations, preferably at separate business entities that provide products and/or services related to the order(s), the order fulfillment devices are preferably operable in wireless communication with the server computer and configured to receive the orders from the order processing and fulfillment system server computer, and to provide confirmation of the order receipt, as well as provide a confirmation of the order fulfillment or completion, in addition to providing a printout having at least one digital representation of the order, the at least one digital representation further including at least one symbol. Furthermore, the order processing and fulfillment system server is configured to route the messages containing the orders to a selected or predetermined order fulfillment device, specified in the order or determined by the order content and/or customer indication or selection for fulfillment.

Referring now to the drawings in general, the illustrations are for the purpose of describing a preferred embodiment of the invention and are not intended to limit the invention thereto. In the figures, the printer device is generally referenced 10. In the various figures, like numerals designate the same components in different views.

The system and apparatus of the present invention and as illustrated in the figures are operable and function to perform method steps for order processing, management, and fulfillment including the steps of: receiving at an order recipient server computer, at least one message including an order that was initiated and sent from a corresponding at least one remote mobile communications devices over a communications network; the order recipient server computer transforming the order into a digital representation of the order including at least one unique symbol and transmitting the order over the network to at least one order fulfillment printer device located at an order fulfillment entity; the order fulfillment printer device receiving the order and automatically and/or autonomously transforming the order to a printed order, including the digital representation of the order having the at least one unique symbol; and the order fulfillment printer device automatically producing a printout of the order. Also, the method steps may further include the step of the order fulfillment printer device automatically generating an audible and/or visual alert when the order is received. Additionally, after completion of the order fulfillment, the at least one unique symbol is scanned by the order fulfillment printer device and an order fulfillment message is automatically generated and sent to the order recipient server via the network.

In other embodiments of the present invention, a system for order processing, management, and fulfillment is provided, including an order recipient server computer constructed and configured in electronic communication over a network with a multiplicity of remote communication customer devices and a multiplicity of order fulfillment printer devices positioned remotely; at least one message initiated and sent by the remote communication customer devices to the order recipient server computer, the at least one message including an order for product(s) and/or service(s) offered by a vendor; the order recipient server computer operable to transform the message into a digital representation of the order including at least one unique symbol, and to transmit the order over the network to the at least one order fulfillment printer device located at an order fulfillment entity for the vendor; the order fulfillment printer device operable to receive the order and automatically and/or autonomously transform the order to a printed order, including the digital representation of the order having the at least one unique symbol; and a printout of the order automatically produced by the order fulfillment printer device at the order fulfillment location. Preferably, the at least one symbol is unique to each order.

The order fulfillment printer device is operable to receive messages via wireless network-based communication, and to automatically generate an audible and/or visual alert when the order is received. Also, an order fulfillment message is automatically generated and sent to the order recipient server via the network by the order fulfillment printer device.

The present invention further provides a printer device for use in a system for order processing, management, and fulfillment including the components illustrated in the figures and described hereinbelow, and operable to receive and printout an order received by wireless messaging to the printer device.

Figure 8:
FIG. 8 is an illustration of an order printout with at least one digital representation of the order.
Figure 8:
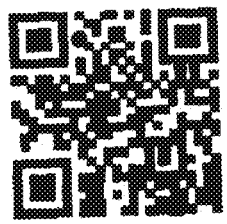
Figure 8:

FIG. 1 is a schematic diagram showing a front perspective view of one embodiment of the apparatus of the invention, a thermal printer device 10 having a power supply and/or power cord for connecting to power supply 12, and hardware, firmware and software that is operable for activating the device and performing the functions described herein (not shown). A symbol reader 14 is provided for reading the symbol (QR code) on the order printout (FIG. 8). A light 29 may be provided along the base or sides. Functional buttons 16, 18 for selective activation of device functionality are provided on a depressed or inset surface 24 to avoid accidental selection or activation; the inset surface may further include a texture change around the buttons, but is preferably slightly inset from the main printer body to avoid accidental activation. One functional button 18 is provided for selective indication of order receipt for fulfillment by a fulfillment user or personnel. Another functional button 16 is provided to automatically call or message the sending entity, i.e., the entity that sent the order message to the fulfillment entity having the printer device on location, for providing a confirmation or other indication that the order was received at the printer device for order fulfillment processing. A hinged lid 25 (FIG. 2) or cover having a hinged opening area and a second hinged edge 20 that is equipped with a serrated edge 21 that is angled to push paper up on its way out of the device and for cutting paper for the order printout from the thermal printer device. A thermal printer roller 23 is provided for providing the thermal printing on thermal paper roll (not shown) and output from the device through an exit opening 22, and providing a slot with a curved top for paper to easily exit and to help the paper curl up on its way out; thermal printing methods are well-established in the prior art and known to one of ordinary skill. In preferred embodiments, 80 mm wide thermal paper is used, in particular, importantly, where point of sale (POS) device capability is integrated within the housing of the printer device.

The base of the printer device includes raised footings 28 positioned at spaced apart locations on the bottom of the printer device for supporting it on a horizontal surface to provide even and stable positioning during operation; alternatively, the printer device may be mounted on a wall or vertical surface (not illustrated), and in one embodiment the bottom central area would include at least one hang hole (not shown) for wall mounting. A plurality of air vents or holes 26 are provided along the bottom side of the device for cooling of the internal components.

Figure 2:
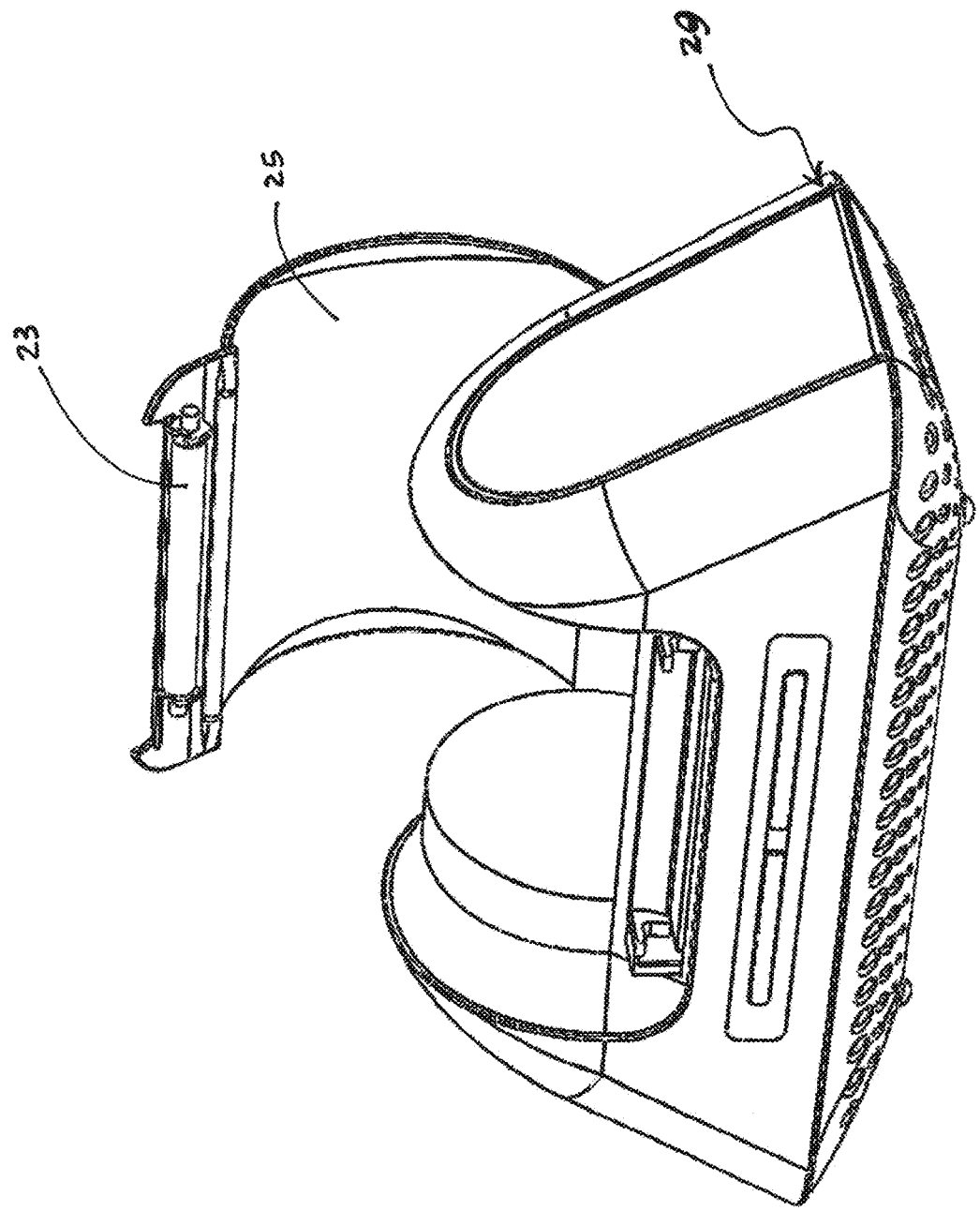
FIG. 2 is a schematic diagram showing another perspective view of the invention with top or lid open for the apparatus illustrated in FIG. 1.
Figure 3:
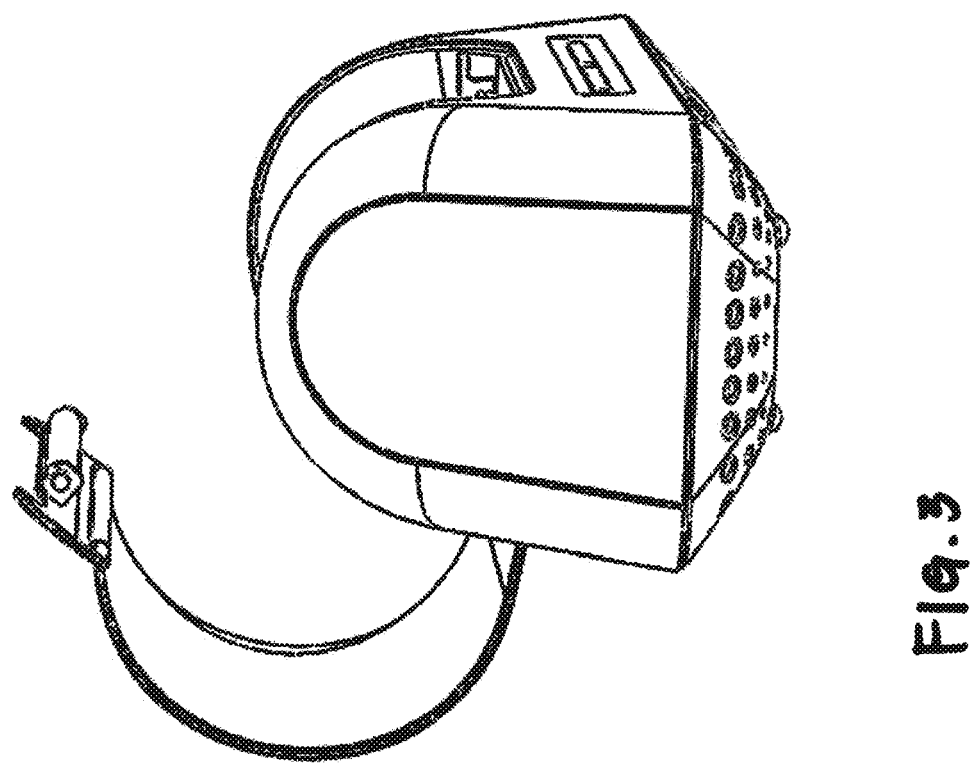
FIG. 3 is a schematic diagram showing a side perspective view of the invention with top open for the apparatus illustrated in FIG. 1.
Figure 4:
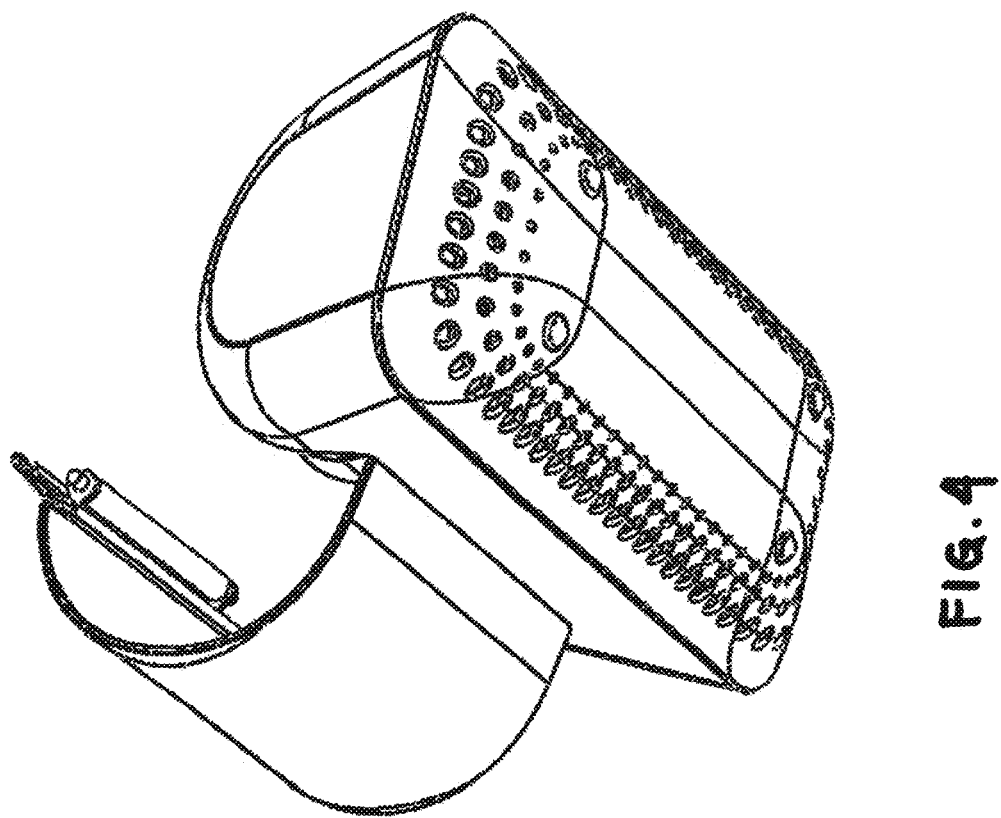
FIG. 4 is a schematic diagram showing a bottom rear perspective view of the invention with top open for the apparatus illustrated in FIG. 1.
Figure 5:
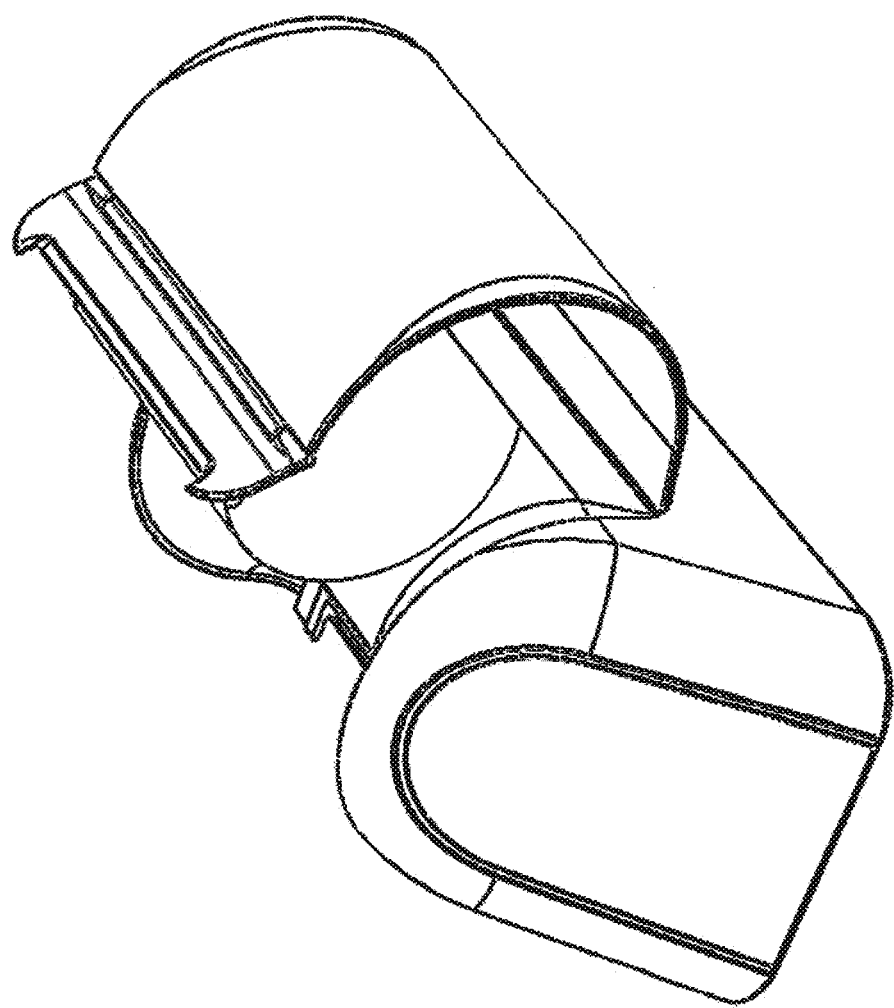
FIG. 5 is a schematic diagram showing a top side perspective view of the invention with top open for the apparatus illustrated in FIG. 1.
Figure 6:
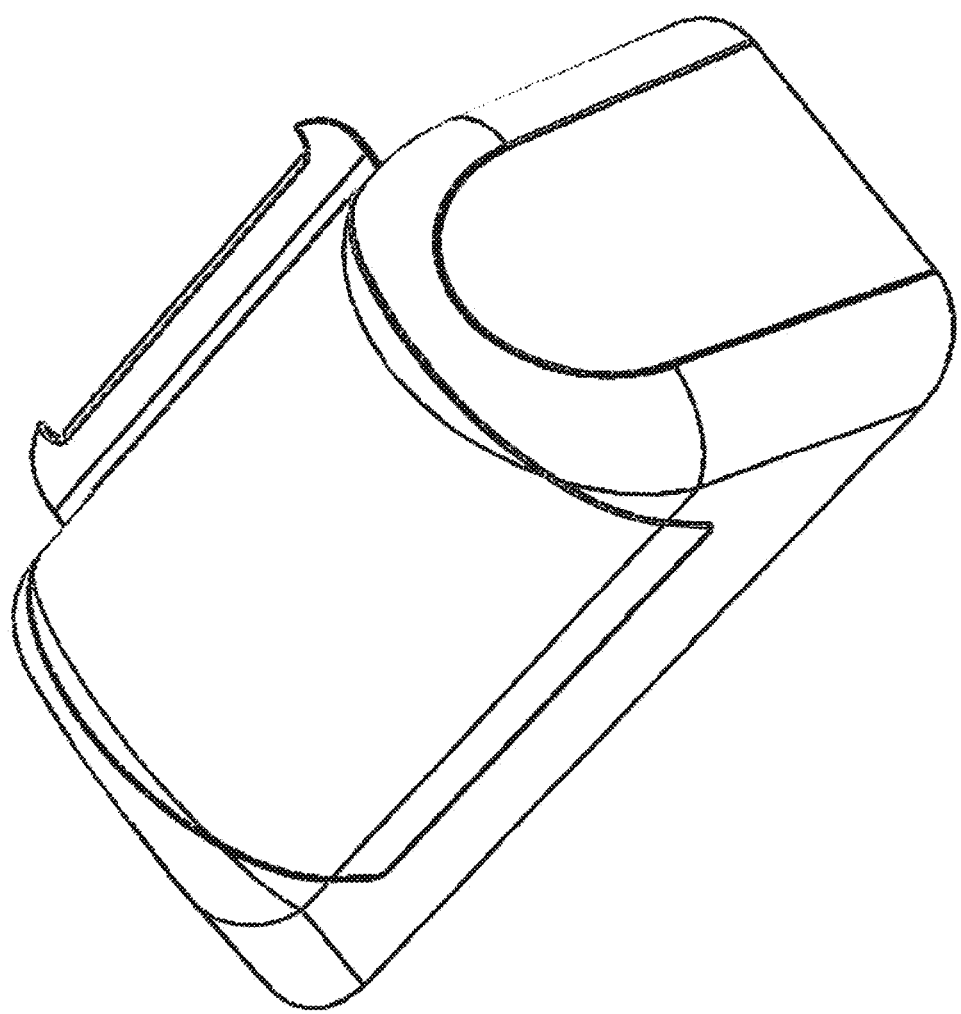
FIG. 6 is a schematic diagram showing a top perspective view of the invention for the apparatus illustrated in FIG. 1.
Figure 7:
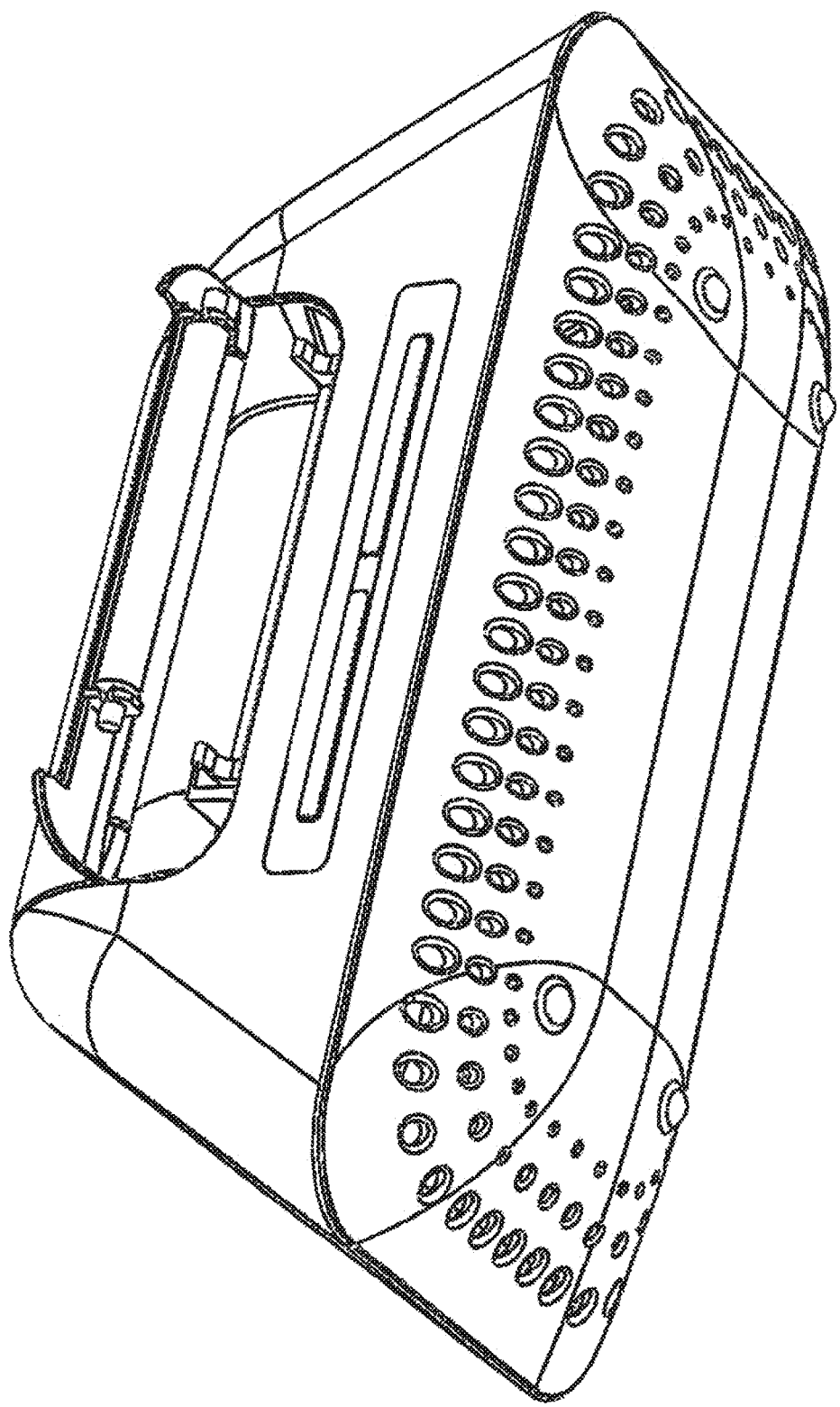
FIG. 7 is a schematic diagram showing a bottom perspective view of the invention for the apparatus illustrated in FIG. 1.

FIG. 2 is a schematic diagram showing another perspective view of the invention with top or lid open for the apparatus illustrated in FIG. 1, illustrating the printer head roller attached to the hinged door or top lid. FIG. 3 is a schematic diagram showing a side perspective view of the invention with top open for the apparatus illustrated in FIG. 1. FIG. 4 is a schematic diagram showing a bottom rear perspective view of the invention with top open for the apparatus illustrated in FIG. 1. FIG. 5 is a schematic diagram showing a top side perspective view of the invention with top open for the apparatus illustrated in FIG. 1. FIG. 6 is a schematic diagram showing a top perspective view of the invention for the apparatus illustrated in FIG. 1. FIG. 7 is a schematic diagram showing a bottom perspective view of the invention for the apparatus illustrated in FIG. 1.

FIG. 8 is an illustration of an order printout with at least one digital representation of the order. Specifically, a QR code is provided as the at least one digital representation of the order (80). Other information, including order content, price, time, date, recipient identification, order fulfillment identification (blacklined), are illustrated in addition to the QR code on the order printout for the convenience of order fulfillment personnel who may read the order printout in hardcopy format instead of digital review on a display. Alternatively, in one embodiment, the at least one digital representation of the order is provided solely by a symbol, e.g., the QR code, which corresponds to the entire order information (and the symbol is unique to each order), including but not limited to order content, price, payment information, order placement time and date, order fulfillment time and date, recipient identification, order fulfillment identification, customer identification, and combinations thereof; in this case, the order fulfillment printer device receives a message with the QR code and automatically produces a printout of the order with only the QR code visibly represented on the order printout. Importantly, the present invention provides that the symbol is unique to each order. While the printout may be scanned by a separate reader with a display (e.g., smartphone with a software application for optically scanning and displaying the text-based or alphanumeric-based order information) for use by order fulfillment personnel, the present invention best mode includes integration of optical scanning device within the housing of the thermal printer device for performing the method steps described. After completion of the order fulfillment, the QR code is scanned by the printer device and an order fulfillment message is automatically generated and sent to the order recipient server via the network.

Figure 9:
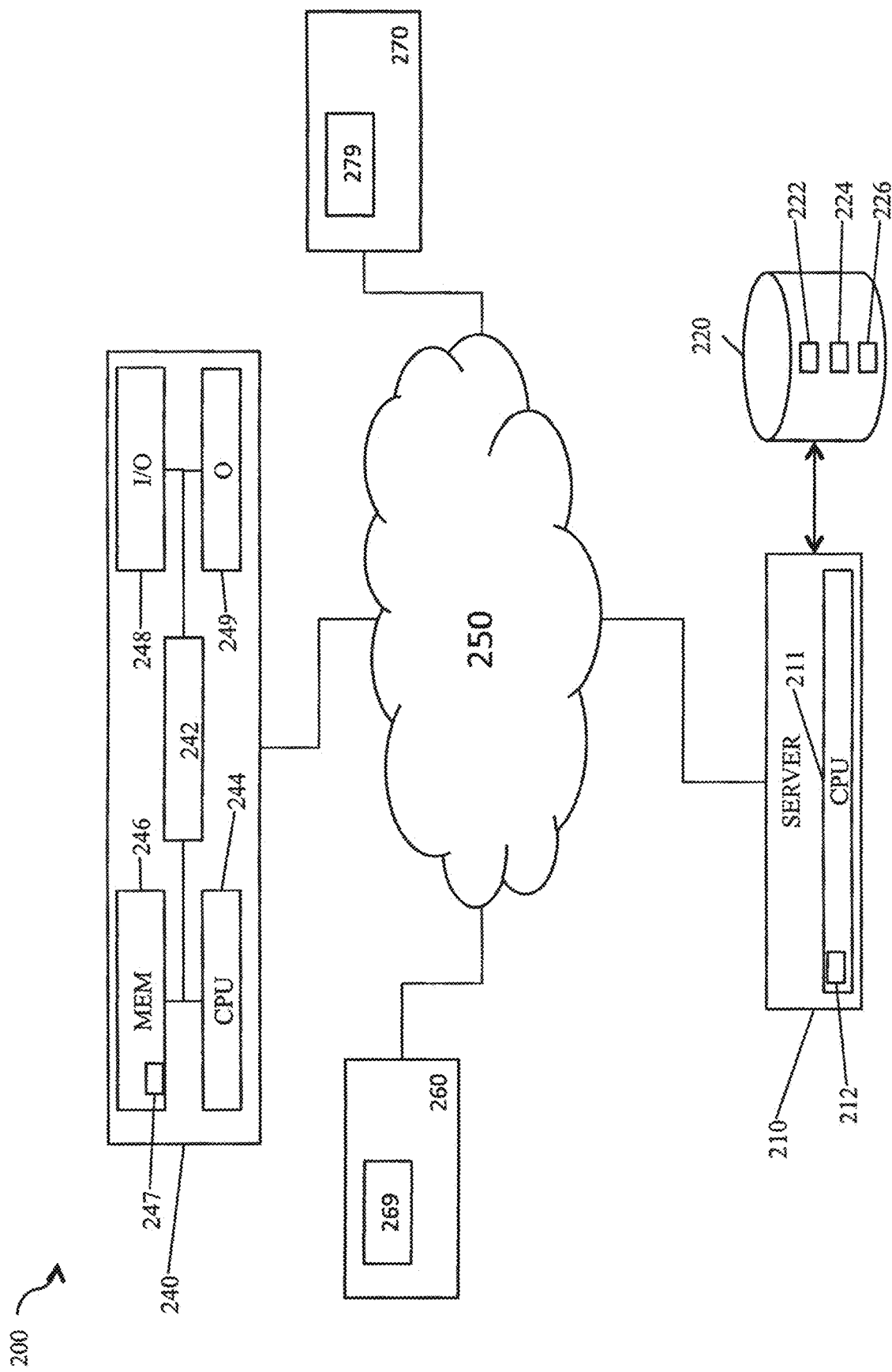
FIG. 9 is a schematic diagram illustrating a distributed system and network for communication in another embodiment of the invention.

FIG. 9 is a schematic diagram illustrating a distributed system and network for communication in another embodiment of the invention. As illustrated in FIG. 9, a basic schematic of some of the key components of a virtualized computing (or cloud-based) system including the printer device as illustrated in the other figures, according to the present invention are shown. The system 200 comprises a server 210 with a processing unit 211. The server 210 is constructed, configured and coupled to enable communication over a network 250. The server provides for user interconnection with the server over the network using a remote computer device or a personal computer (PC) 240 positioned remotely from the server. Furthermore, the system is operable for a multiplicity of remote personal computers or terminals 260, 270 for example, in a client/server architecture, or through a website and the Internet for network-based order initiation; as described hereinabove, a multiplicity of remote mobile devices for customer initiation of corresponding orders are provided, as well as a multiplicity of order fulfillment printer devices located at distributed order fulfillment locations (preferably, each order fulfillment entity has at least one printer device).

Alternatively, a customer user may interconnect through the network 250 using a user device such as a personal digital assistant (PDA), mobile communication device, such as by way of example and not limitation, a mobile phone, a cell phone, smart phone, tablet computer, laptop computer, netbook, a terminal, or any other computing device suitable for network connection. Also, alternative architectures may be used instead of the client/server architecture. For example, a PC network, or other suitable architecture may be used. The network 250 may be the Internet, an intranet, or any other network suitable for searching, obtaining, and/or using information and/or communications. The system of the present invention further includes an operating system 212 installed and running on the server 210, enabling server 210 to communicate through network 250 with the remote, distributed user devices as well as the remote, distributed order fulfillment printers located at order fulfillment locations. The operating system may be any operating system known in the art that is suitable for network communication, including wired and/or wireless, specifically 3G and 4G networks and systems. The printer device preferably communicates wireless messaging as described hereinabove.

In a further embodiment of the present invention, the printer device includes a "phone home" button operable to notify the sending server (and thus the sender) that there is a problem with the order, and they need to contact the fulfillment location. In another embodiment of the present invention, the printer device includes a microphone. In another embodiment of the present invention, the printer device includes a speaker. In one embodiment of the present invention, the phone home button is operable to initiate a phone call over a cellular network directly to the sender at a predetermined phone number from the fulfillment location, with staff at the fulfillment location able to literally speak into the printer through the microphone and communicate with the sender. The phone home button is a physical button in one embodiment. In another embodiment, the phone home button is a touch screen button. In another embodiment, the "phone home" functionality is activatable via a voice command such as "phone home." In yet another embodiment, selection of the phone home button or activation of the phone home functionality provides for sending a text message or an email to the customer communication device.

In a further embodiment, the printer device includes an Ethernet interface. Preferably, the printer device also includes a WiFi interface for communication. In one embodiment, the WiFi interface is used when 3G, 4G, or any other cellular network is not available for communication.

Certain modifications and improvements will occur to those skilled in the art upon a reading of the foregoing description. By way of example and not limitation, the order processing and fulfillment systems and methods of the present invention, including the order fulfillment printer device are integrated with point of sale (POS) systems for coordinating payment of the order remotely as well. Also, while physical buttons for selective activation are illustrated in the figures, virtual keys or buttons may be provided with a touch screen for selective activation.

Additionally, while a thermal printer is included in examples of the preferred embodiments for generating a printout of the order, other printing equipment may also be used for printing the order, including the unique order symbol for use by fulfillment and for scanning to generate the automated order fulfillment completion message. In another example, data from the scanned order fulfillment message may be combined with order data stored at the recipient server computer (dispatch computer) and analytics may be provided for each order fulfillment entity and/or for all order fulfillment entities relating to the orders received over time, including but not limited to volume of orders per day and/or per time of day or period of time, time between order confirmation and completion of order fulfillment (based upon the time difference between the message received at the recipient server of order conformation and the time the unique symbol or QR code is scanned to indicate order fulfillment and that the order fulfillment message is received by the recipient server, and combinations thereof; other anonymized data and analysis thereof may be stored at the server for use in marketing, planning, and process improvement with the order fulfillment entities.

Other analysis of data relates to specific customer data, anonymized customer data, specific employee data, and/or anonymized employee data and includes the number of times the particular customer has ordered a certain item, the number of times a certain item has been ordered that day/week/month/year, the most used ingredients used in fulfilling customer orders, the least used ingredients used in fulfilling customer orders, estimated or actual profit margins from orders based on the amount/type of ingredients used, the sale price of the order, average sale prices of orders, the most profitable menu items, the least profitable menu items, employees who fulfill the most orders, employees who fulfill the least orders, analysis of an employee's speed, efficiency, and accuracy regarding order fulfillment, an analysis of common customer comments and/or complaints, an analysis of customer comments and/or complaints by menu item, an analysis of customer comments and/or complaints by employee, an analysis of delivery orders by area including areas most frequently delivered to and areas least frequently delivered to, etc. Preferably, a GUI is provided for analysis of specific customer data, anonymized customer data, specific employee data, and/or anonymized employee data. By way of example and not limitation, an analysis of delivery orders within a delivery area including areas most frequently delivered to and areas least frequently delivered to includes a map with color codes, a plurality of symbols such as asterisk or Xs, or shading to indicate the areas most frequently delivered to and areas least frequently delivered to. In another embodiment, a GUI provides graphs or charts (bar, line, pie, etc.) of orders per time period and/or menu items ordered per time period.

In one embodiment, the thermal printer further includes a wireless communication system, wherein the wireless communication system is operable to broadcast, pair, and communicate with other devices. Broadcasting from the wireless communication system includes, in one embodiment, operation in an advertising mode, wherein information describing the thermal printer or other descriptive information is passively broadcast (e.g., an establishment name, an identification (ID) number, a website, a message, an advertisement, a menu, or a marketing call to action). In one embodiment, the wireless communication system is a built-in Bluetooth Low Energy (BLE) beacon operating in advertising mode, wherein at least one computer device (e.g., a mobile device such as a smartphone or smartwatch) is operable to receive the broadcast information. Upon receiving the broadcast information, the computer device is operable to display the information, connect to a server, upload the information to the server, access an online web site, download corresponding information from the thermal printer or from an online server, and/or connect to the wireless communication system for further interaction. The wireless communication system is operable to establish a connection with the at least one computer device and receive from the at least one computer device a device ID number, a name of the device, a user account associated with the device, or any other identifying information. The thermal printer is further operable to determine if identifying information received from the at least one computer device is associated with a user account, profile, or previous data entry, such as a previously placed order, wherein the thermal printer is operable to query an internal database and/or query an external server or database in order to retrieve historical access and communication history. If the at least one computer device is associated with historical access or communication history, the thermal printer is operable to broadcast relevant targeted information, including a message (e.g., "Welcome Back!"), a suggested order based on previous purchases, an account balance, rewards progress, or incentives available for the at least one account. Notably, incentives include any discount, reward, coupon, or offer known in the art of digital marketing. The thermal printer is thus operable to send and receive order information and fulfil received order information in a similar manner to order information received over the Internet. The thermal printer is operable to track and record the interaction data, including identifying, tracking, and analyzing data related to nearby devices as well as create user accounts and/or profiles (locally or at a remote server) for devices without associated accounts.

In another embodiment, an application is operable to communicate with the thermal printer and/or a server in order to recognize an order submission opportunity. For example, in one embodiment, the application is installed on a smartphone, wherein the application is operable to detect via wireless communication hardware on the smartphone (e.g., Bluetooth, WiFi, NFC, iBeacon) a wireless communication signal from a nearby printer (e.g., a BLE signal, a WiFi signal, an NFC signal, an iBeacon signal). Upon detection of the signal, the application is operable to query a server to match the signal to a printer device. In one embodiment, the signal includes an establishment name, an identification (ID) number, a website, a message, an advertisement, a menu, or a marketing call to action. Alternatively, the application is operable to match the signal to a printer device based on a local database of printers and/or based on a set signal convention that identifies the printer. The application is operable to transmit or display a notification on the smartphone based on the matched printer device. For example, if one BLE signal is matched to a printer device associated with Bill's Barbecue, the application is operable to send a notification to the smartphone, "Order now at Bill's Barbecue!" In another embodiment, the application is operable to query an external server or an internal memory and database for historical access, communication, and order data and adjust a notification based on the queried information. For example, a first identification of the printer results in a notification that states, "Place your first order at Bill's," whereas an identification of the printer after a first order states, "Welcome to Bill's. Try the Working Man's Combo again!" The server is operable to receive a query and/or a message including the establishment name, an identification (ID) number, a website, a message, an advertisement, a menu, or a marketing call to action and match the query and/or message to at least one thermal printer, device ID, and/or establishment and return a response including the thermal printer, device ID, and/or establishment. The server is further operable to communicate the interaction to the thermal printer and/or the establishment for analytics and proximity marketing.

The wireless communication system is further operable to assist in communication and verification for delivery systems. For example, a third-party delivery system in network communication with the thermal printer is operable to identify when a mobile device of a delivery driver is within proximity of a restaurant. In one embodiment, an application installed on the delivery driver's phone identifies a BLE beacon for the restaurant's thermal printer, wherein the application communicates the identification to a server of the delivery service, and wherein a location of the delivery driver is updated, stored, and communicated with a customer. Additionally, the application is operable to communicate with the thermal printer, wherein the thermal printer is operable to identify which orders correspond to the delivery driver based on information queried or received from the server of the delivery service. The thermal printer is thus operable to automatically print labels or symbols based on the identification of orders and/or perform verification of order elements before hand-off. In one embodiment, verification occurs via scanning of the symbols. For example, when a delivery driver nears an establishment, an application on a smartphone of the delivery driver determines proximity to a BLE beacon associated with a thermal printer associated with the establishment. The application queries a server of the delivery service based on the BLE signal to update a location of the delivery driver. The server is then operable to update a location of the delivery driver and issue a notification to the establishment indicating presence of the delivery driver and authorizing payment for any ordered items. Alternatively, the application of the delivery driver is operable to connect and communicate with the thermal printer directly to indicate a presence, authorize payment, and/or begin verification processes. Preferably, an order recipient server is operable to receive and responds to any communication from the application, the server of the delivery service, and/or the thermal printer in this interaction.

In one embodiment, the range of the wireless communication system is up to 300 feet. In another embodiment, the range is up to 150 feet. In a further embodiment, the range is between 30 and 60 feet.

The thermal printer preferably includes over-the-air (OTA) update capabilities, wherein the thermal printer is operable to connect to and query a server for firmware and software updates. Notably, the server is constructed to allow multiple, concurrent connections to all registered or networked thermal printers. When an update is available, the server is operable to send a notification to all connected printers identifying an available update. Each of the printers are operable to request the update and concurrently download corresponding update files.

In one embodiment, the thermal printer is operable to modify a network operating mode based on reading a symbol. For example, upon scanning a QR code with operating mode instructions, the thermal printer enables a WiFi radio. Alternatively, scanning the same QR code or a second, dedicated QR code changes the network operating mode to cellular connectivity, wherein a cellular radio is activated and the thermal printer connects to a 3G, 4G, or 5G network wireless network. In one embodiment, a QR code is network specific, wherein scanning a QR code not only activates a wireless operating mode (e.g., WiFi), but it also enables connectivity to a specific frequency, band, carrier, and/or SSID. The WiFi/cellular instructions are operable to be integrated into a configuration symbol for provisioning and setting up a thermal printer. In another embodiment, scanning the symbol enables WiFi Protected Setup (WPS) mode, wherein the thermal printer is able to easily able to see, connect, and communicate with devices over WiFi bands with or without sharing a security passkey. In yet another embodiment, scanning a symbol enables a Bluetooth radio, a BLE mode (e.g., an advertising mode, or any other wireless network communication radio known in the art (e.g., NFC, iBeacon).

In an alternative embodiment, an order printer is a third-party printer (e.g., an external laser printer, ink printer, or thermal printer) that is in network communication with an order fulfillment computer, wherein the order fulfillment computer performs each of the functions of the thermal printer embodiment except for the printing functionality. Upon receiving and processing an order, the order fulfillment computer is operable to print a label or symbol via the third-party printer. The order fulfillment computer is further operable to scan symbols (e.g., QR codes), similar to the thermal printer embodiment. In another embodiment, the thermal printer sends the label, symbol, and/or other order information to a server associated with a label printing service, wherein the label, symbol, and/or other order information is printed by label printing service.

In one embodiment, labels and symbols are created discreetly, wherein only partial information is printed on the label or symbol. For example, the system receives an order from John Doe for a burger, fries, milkshake, and a drink, and prints "J. D." on a label, and a QR code that only identifies that the order includes four different items. In another embodiment, identifying information is only communicated via a symbol, wherein no information is printed in plain text or communicated to a third-party printer. In a third-party printer embodiment, an order fulfillment computer performs anonymization and/or privacy operations before generating a label, symbol, or print instructions to ensure that private information is not shared with an external printer or computer.

Labels are further operable to be categorized and systematically connected by the system. For example, in one embodiment, an order includes labels and/or symbols for each item of the order as well as a master label, including a name for each individual item or element on the individual labels. Scanning the master label identifies an order with four items, including the burger, fries, milkshake, and drink. Each item is then scanned individually to ensure that all elements of the order are included. Alternatively, scanning one item from the four begins the verification process without the need for a master label. In another embodiment, the scanning system requires verification to occur in a set order. For example, scanning the master label for an order begins a verification process, wherein the labels must be scanned in the order of: drink, milkshake, burger, fries. If one of these is scanned out of order or is missing, the thermal printer is operable to issue a warning, cancel the order, and/or send a message to a server computer, nearby device, and/or another device associated with the order.

The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for order processing, management, and fulfillment comprising:
    configuring an order fulfillment printer system located at an order fulfillment entity by the order fulfillment printer system scanning a unique configuration symbol;
    an order recipient server computer receiving a message from at least one customer device, wherein the message includes an order;
    wherein the order recipient server computer is in communication with the order fulfillment printer system over a network;
    the order recipient server computer transforming the order into a digital representation of the order and transmitting the digital representation of the order over the network to the order fulfillment printer system located at the order fulfillment entity, wherein the digital representation of the order is provided by at least one unique order symbol, and wherein the at least one unique order symbol corresponds to order information for the order;
    the at least one unique order symbol comprising a unique master symbol and a unique additional symbol for each item in the order;
    the order fulfillment printer system receiving the digital representation of the order and automatically transforming the digital representation of the order to a printed order by automatically producing a printout of the order, wherein the printed order includes a printed representation of the digital representation of the order; and
    upon completion of the order, the order fulfillment printer system scanning the at least one unique order symbol to obtain present order data and transmitting an order fulfillment message to the order recipient server computer;
    wherein the order fulfillment printer system is operable to initialize verification of a presence of each item of the order via scanning the unique master symbol, and wherein the unique additional symbol for each item is scanned to verify the presence of each item before the order fulfillment message is sent to the order recipient server computer.

2. The method of claim 1, wherein the order information includes a content of the order and identifying information associated with the order.

3. The method of claim 2, wherein the order fulfillment printer system is further operable to determine if the identifying information is associated with a user account, profile, or previous data entry, and wherein the order fulfillment printer system is operable to create user accounts or profiles for a customer device without an associated user account or profile.

4. The method of claim 1, further comprising providing a phone home button on the order fulfillment printer system to communicate with the at least one customer device.

5. The method of claim 1, wherein the configuring further includes establishing a wireless operating mode, wherein the wireless operating mode is either WiFi or cellular.

6. The method of claim 1, wherein the order fulfillment printer system includes an order fulfillment computer in network connection with a third-party printer, wherein the third-party printer automatically produces the printout of the order.

7. The method of claim 6, wherein the automatically transforming the digital representation of the order to a printed order further comprises the order recipient server computer abstracting the order information before sending the abstracted digital representation of the order to the third-party printer.

8. The method of claim 1, further comprising the order fulfillment printer system broadcasting a wireless communication signal including identifying information for the order fulfillment printer system; and wherein the message including an order sent by the at least one customer device to the order recipient server computer further includes the identifying information for the order fulfillment printer system derived from the wireless communication signal.

9. The method of claim 1, further comprising providing analytics for the order and/or a plurality of other orders, wherein the analytics are anonymized.

10. A method for order processing, management, and fulfillment comprising:
    configuring an order fulfillment printer system located at an order fulfillment entity by the order fulfillment printer system scanning a unique configuration symbol;
    receiving at an order recipient server computer a message including an order that was initiated and sent from a remote customer device over a network;
    the order recipient server computer transforming the order into a digital representation of the order and transmitting the digital representation of the order over the network to the order fulfillment printer system located at the order fulfillment entity, wherein the digital representation of the order is provided by at least one unique order symbol;
    the at least one unique order symbol comprising a unique master symbol and a unique additional symbol for each item in the order;
    the order fulfillment printer system receiving the digital representation of the order and automatically transforming the digital representation of the order to a printed order by automatically producing a printout of the order, wherein the printed order includes a printed representation of the digital representation of the order;
    the order recipient server computer receiving a message from at least one device, wherein the message is associated with the order; and
    upon receiving the message, the order fulfillment printer system scanning the at least one unique order symbol to obtain present order data and transmitting an order fulfillment message to the order recipient server computer;
    wherein the order fulfillment printer system is operable to initialize verification of a presence of each item of the order via scanning the unique master symbol, and wherein the unique additional symbol for each item is scanned to verify the presence of each item before the order fulfillment message is sent to the order recipient server computer.

11. The method of claim 10, wherein the at least one unique order symbol identifies information about the order, including geolocation coordinates or an address for delivery of the order.

12. The method of claim 10, wherein information associated with the order further comprises payment information for the order.

13. The method of claim 10, further comprising providing analytics for the order and/or a plurality of other orders, wherein the analytics are anonymized.

14. The method of claim 13, wherein the analytics include percentages of deliveries or numbers of deliveries made within segments of a delivery area.

15. The method of claim 10, further comprising the order fulfillment printer system broadcasting a wireless communication signal including identifying information for the order fulfillment printer system; and wherein the message associated with the order sent from the at least one device to the order recipient server computer further includes the identifying information for the order fulfillment printer system derived from the wireless communication signal.

16. A system for order processing, management, and fulfillment comprising:
an order fulfillment printer system located at an order fulfillment entity;
an order recipient server computer;
wherein the order fulfillment printer system is operable to be configured via scanning a unique configuration symbol;
wherein the order recipient server computer is operable to receive a message from at least one customer device, wherein the message includes an order;
wherein the order recipient server computer is operable to transform the order into a digital representation of the order and transmit the digital representation of the order over a network to the order fulfillment printer system located at the order fulfillment entity, wherein the digital representation of the order is provided by at least one unique order symbol and the at least one unique order symbol corresponds to order information for the order;
wherein the at least one unique order symbol comprises a unique master symbol and a unique additional symbol for each item in the order;
wherein the order fulfillment printer system is operable to receive the digital representation of the order and automatically transform the digital representation of the order to a printed order by automatically producing a printout of the order, wherein the printed order includes a printed representation of the digital representation of the order;
wherein the order fulfillment printer system is operable to scan the at least one unique order symbol to obtain present order data and transmit an order fulfillment message to the order recipient server computer; and
wherein the order fulfillment printer system is operable to initialize verification of a presence of each item of the order via scanning the unique master symbol, and wherein the unique additional symbol for each item is scanned to verify the presence of each item before the order fulfillment message is sent to the order recipient server.

17. The system of claim 16, wherein the order fulfillment printer system is operable to adjust a wireless operating mode based on the scanning the unique configuration symbol.

18. The system of claim 16, wherein the fulfillment printer system is operable to initialize verification of a presence of each element of the order via scanning one of the additional order symbols.

19. The system of claim 16, wherein the order fulfillment printer system is operable to broadcast a wireless communication signal including identifying information for the order fulfillment printer system; and wherein the message sent from the at least one customer device to the order recipient server computer further includes the identifying information for the order fulfillment printer system derived from the wireless communication signal.

20. The system of claim 16, further comprising providing analytics for the order and/or a plurality of other orders, wherein the analytics are anonymized.

* * * * *